Sept. 17, 1946.  A. A. LA POINTE  2,407,930
SHOVEL
Filed March 9, 1945  3 Sheets-Sheet 2
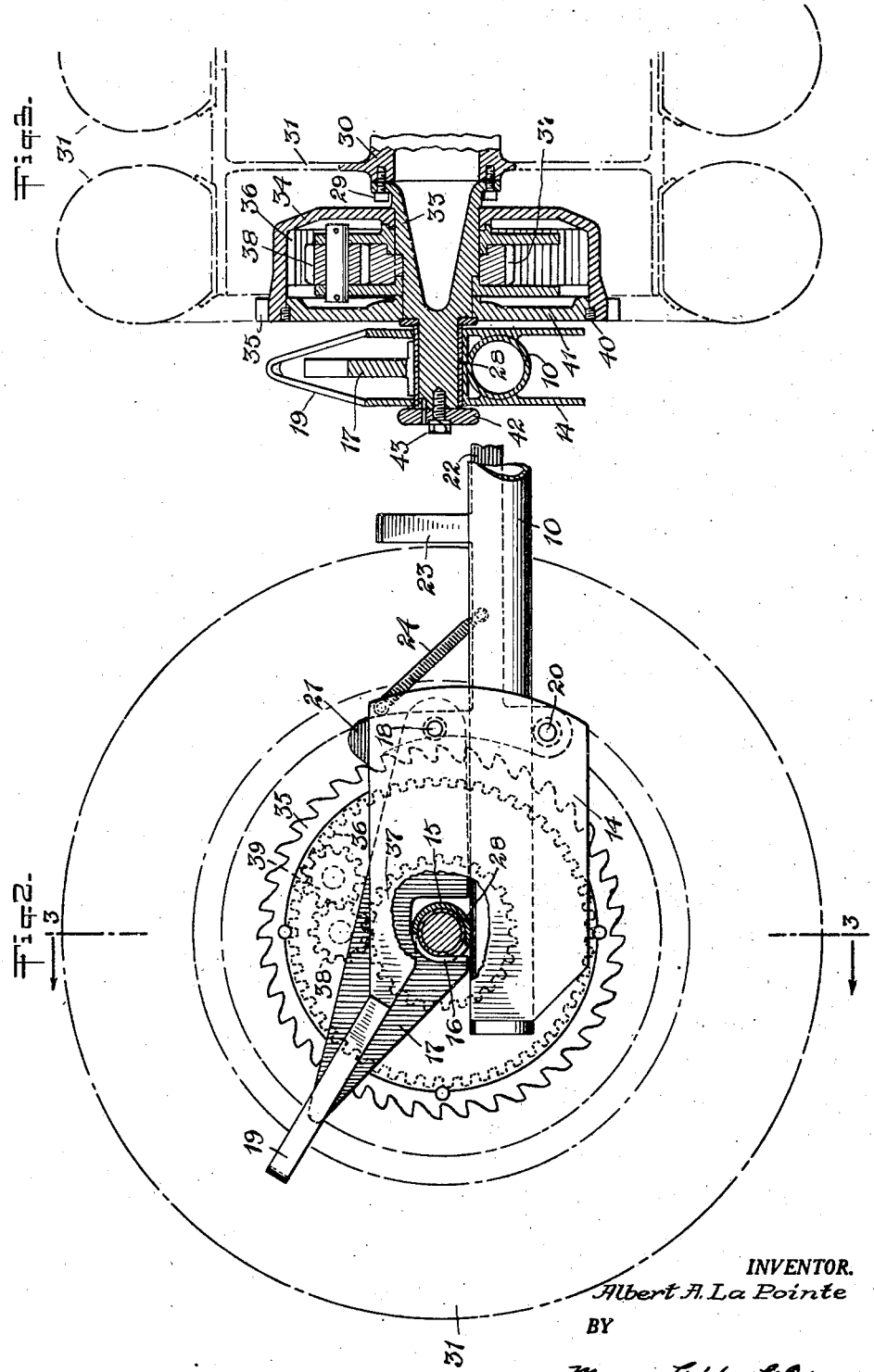
INVENTOR.
Albert A. La Pointe
BY
Munn, Liddy & Glascum
Attorneys

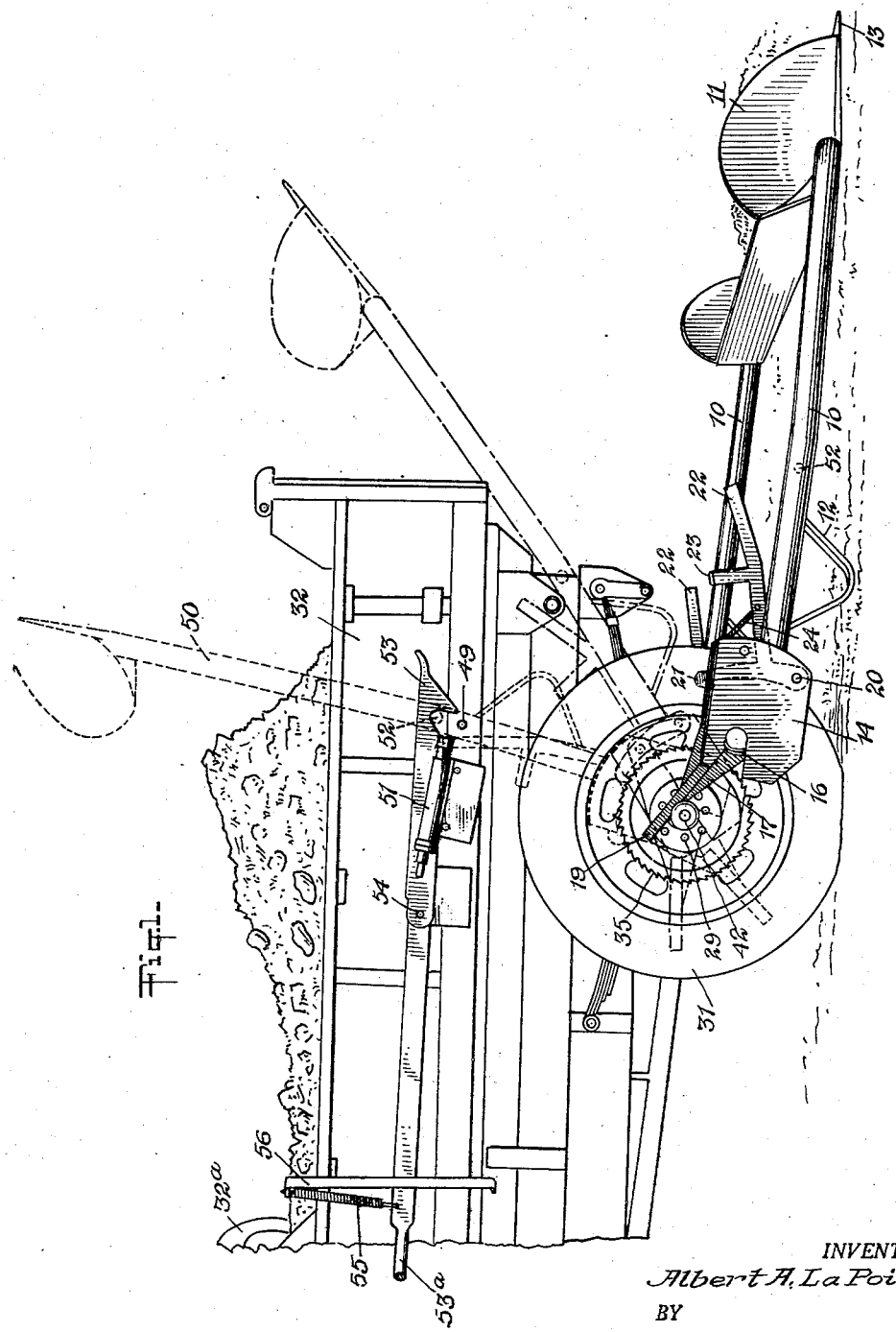

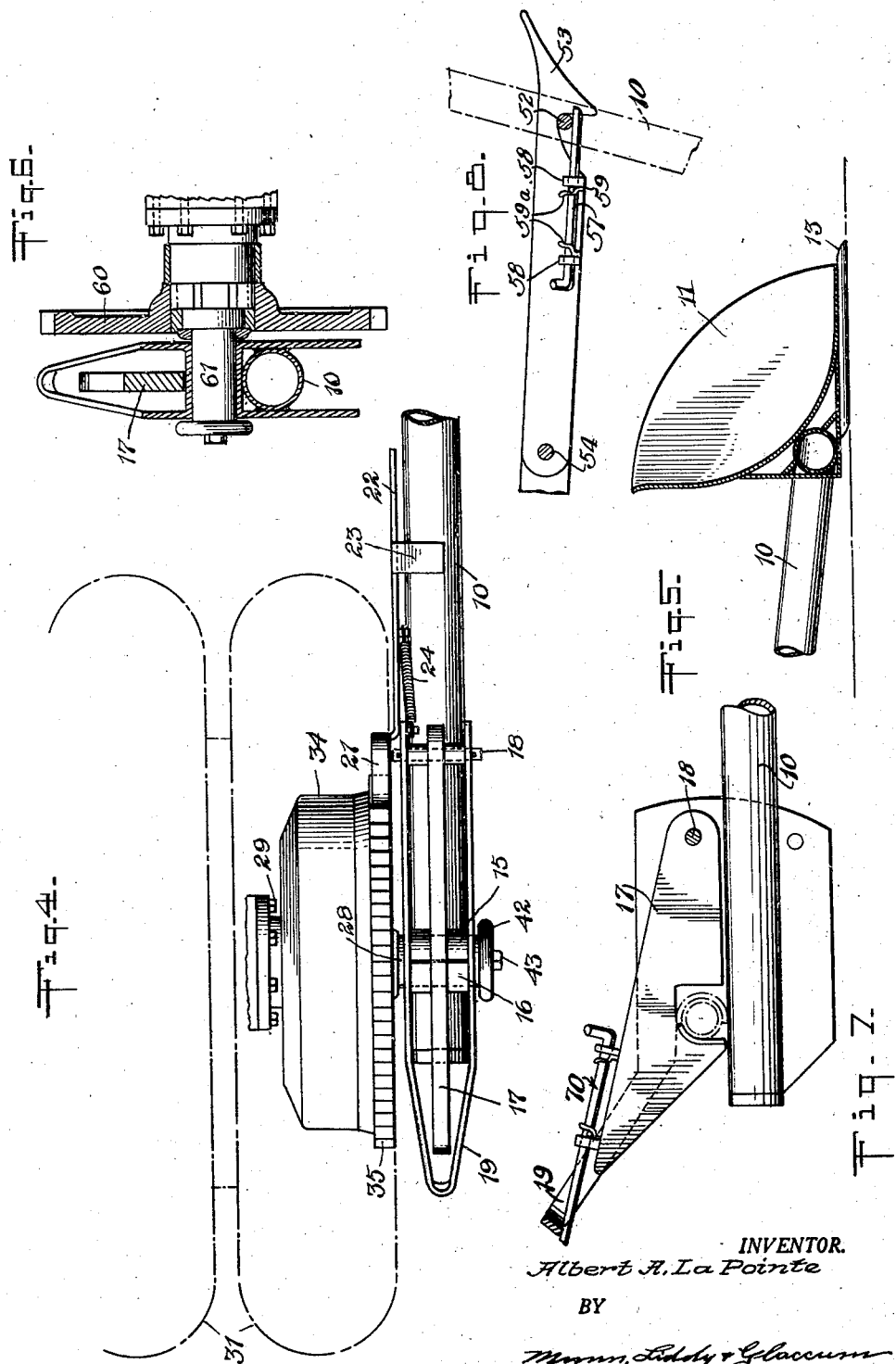

Patented Sept. 17, 1946

2,407,930

UNITED STATES PATENT OFFICE 2,407,930

SHOVEL

Albert A. La Pointe, West Hartford, Conn., assignor to La Pointe Engineering Company, Unionville, Conn., a copartnership Application March 9, 1945, Serial No. 581,729

5 Claims. (Cl. 214—81)

This invention relates to power shovels.

The principal object of the invention is to provide a power shovel which may be operated in combination with a conventional motor truck and which may be powered by the same engine which drives the truck.

Another object of the invention is to provide a power shovel which operates in combination with a conventional motor truck and which automatically enters into operative shoveling position when the truck moves in one direction and which automatically dumps the shoveled material into the truck body when the truck moves in the opposite direction.

A further object is the provision of a power shovel for conventional motor trucks which may be demountably connected to the drive wheels of said trucks and which may function in connection therewith without interfering with the normal operation of the truck itself and with such dumping mechanism as said truck may be provided with.

Still another object of the invention is the provision of a power shovel of the character described which may be utilized in combination with any kind of vehicle having a pair of drive wheels and a body into which to dump the shoveled material.

A still further object is the provision of a power shovel of the character described which may be used in combination with a pair of drive shafts or in combination with a single elongated drive shaft which is affixed to a horizontally reciprocating mechanism of any desirable type and construction, said device being operable in connection with a dump truck, a railroad freight car, a conveyor belt, or in connection with any analogous device or apparatus.

These and other objects are attained by mechanism illustrated in the accompanying drawings in which—

Fig. 1 is a perspective view of the device shown in mounting position with respect to a conventional dump truck, said device being shown in dotted lines mounted on said truck in two different positions with respect thereto;

Fig. 2 is a face view of the pivot and ratchet construction of said device;

Fig. 3 is a section on the line 3—3 of Fig. 2;

Fig. 4 is a plan elevational view of the mechanism shown in Figs. 2 and 3;

Fig. 5 is a sectional view of the scoop of said device;

Fig. 6 is a sectional view similar to that of Fig. 3 of another embodiment of the pivot and ratchet mechanism of the device;

Fig. 7 is a side view of a locking mechanism for use in connection with the latch shown in similar view in Fig. 2; and Fig. 8 is a side view of a locking mechanism for use in connection with the catch mechanism shown in similar view in Fig. 1.

Referring now to Figs. 1 to 5, inclusive, the device herein described and claimed is provided with a pair of arms 10 which are pivoted at one end, as will hereinafter appear, and which carry at their free ends a scoop 11. Each arm is provided with a bracket rest or skid 12 and the scoop is provided with combination skids and diggers 13. At its pivoted end, each arm 10 is affixed, as by welding, to a pair of plates 14 which are provided with open slots carrying a semi-cylindrical plate 15, said plate comprising half of the bearing by which said arm is pivotally mounted, as will hereinafter appear. Plate 15 may be affixed to the arm proper, as by welding, or in any other conventional manner.

Semi-cylindrical member 16 carried by latch 17 which is pivoted at 18 to said plates 14, comprises the second half of said bearing by which said arm is pivotally mounted. It will be seen that when the latch member 17 is pivotally raised, a path of entry is provided through the slots of plates 14 to half bearing 15. When the latch 17 is lowered, the path of entry is shut off and half bearing 16 meets and cooperates with half bearing 15 to provide the necessary bearing by means of which said arm 10 pivots. A V-shaped guide or finder 19 affixed to plates 14 straddles said latch member.

Also pivoted to plates 14 at 20 is a pawl 21. Said pawl is shaped substantially like an F; the top cross piece thereof comprising the pawl member proper and the longitudinal member 22 thereof comprising part of the releasing mechanism hereinafter described. The lower and shorter cross piece 23 of said pawl is bent over at its free end into the path of movement of latch member 17 when said latch member is raised. The object of this construction is to provide an automatic ratchet releasing mechanism which operates when the latch is opened. The relative positions of the latch member 17 and the cross member 23 being as described, when the latch member is raised and brought over toward the rear it engages said cross member and causes the pawl to disengage the ratchet wheel hereinafter described. Spring 24 affixed at one end to plates 14 and at the other end to the longitudinal member 22 of said pawl, serves to urge the pawl into engagement with said ratchet wheel.

Affixed by means of stud bolts 29 to hub members 30 of conventional truck wheels 31 of dumping truck 32 are hub extensions or stud shafts 33 carrying self-oiling sleeves or bushings 28. Rotatably mounted on each said stud shaft is a drum 34 which is provided with external ratchet teeth 35 and internal gear teeth 36. Splined to the stud shaft within said drum is a gear wheel 37. Gear wheel 37 meshes with an idler gear wheel or pinion 38 within said drum and idler 38, in turn, meshes with a second idler 39, also within said drum and idler 39, in its turn, engages the internal gear teeth 36 of said drum. A centrally apertured circular plate 41 affixed by means of screws 40 to the open side of drum 34 encloses the gear wheel and pinions above mentioned.

In consequence of such construction, when wheels 31 of the dumping truck are caused to rotate, stud shafts 33 will be caused to rotate integrally with them and so will gear wheels 37. By reason of the gear train which connects said gear wheels 37 with the internal gear teeth 36 of the drums 34, the drums are caused to rotate but at a much slower rate of speed.

It will be seen that the bearing comprising semi-cylindrical bearings 15 and 16 is adapted to ride on sleeve 28 immediately adjacent drum 34. A cap 42 affixed to the free end of the stud shaft by means of a stud bolt 43 prevents axial displacement of the bearing and hence of the arm to which it is affixed with respect to the stud shaft.

In Fig. 1 the device is shown in mounting position with respect to the stud shafts 33, guides or finders 19 resting upon the stud shaft sleeves 28. When the latch members 17 are raised, an open path parallel with and adjacent to said guide members 19 is opened, leading to the slots in plates 14 and to the semi-cylindrical or half bearing members 15. The truck may be backed up, thereby causing the device and more particularly the guard members 19 thereof to ride up on said stud shaft sleeves until contact is made between said sleeves and the half bearings 15, or the device itself may be pushed up upon said stud shaft sleeves by hand. In either case, when the stud shaft sleeves and the half bearings 15 are properly positioned with respect to each other, the latches 17 are returned to their normal position of rest, thereby bringing half bearings 16 into contact with said sleeves.

When the device is thus properly positioned on the stud shafts as hereinabove described, pawls 21 engage the ratchet teeth 35 of drums 34 in response to the tension exerted upon them by springs 24. The device is now ready to be used.

It will be seen that when the truck is caused to move forward, arms 10 will be caused to pivot upwardly on said stud shafts until they reach the position indicated by dotted lines 50 in Fig. 1. At this point, a bumper 51 on each side of the truck body engages said arms to bring them to an abrupt, yet cushioned stop, thereby throwing the scooped up material, so to speak, into the truck body at a point substantially forward of the arms. At the same time and point, the longitudinal portion 22 of the pawl members are engaged by stud posts 49 fixed in each side of the truck body and the pawls are thereby caused to disengage the ratchet teeth 35 against the tension exerted upon said pawl by spring 24. Simultaneously therewith, a pin 52 on one of said arms 10 is engaged by a catch member 53 pivoted to one side of the truck body by means of pivot pin 54.

To reverse the operation, the catch lever 53 is pivoted on pivot 54 and pin 52 is thereby released. It will be seen in Fig. 1 that the handle end 53a of said catch member extends to the cab 32a of the dumping truck thereby enabling the driver thereof to manipulate the catch member from the cab. The truck is now moved in the opposite direction, namely toward the rear. The force exerted by gravity upon arms 10 and scoop 11 now tends to bring said arms and said scoop down toward the ground. The ratchet mechanism above described controls the speed of this descent, that is, the speed of the descent will be governed by the speed at which the truck is caused to move toward the rear. When the device reaches the position shown by the solid lines in Fig. 1, further movement of the truck toward the rear will have no effect upon the position of said device relative to the truck. In this fashion, it is pushed into a pile of sand or gravel or any other material sought to be removed by means of the truck. When a sufficient amount of this material is scooped up, the truck is stopped and it is now made to move forward again. This has the effect, as has already been indicated, of causing the arms 10 to pivot upwardly on the stud shafts and hence the scoop 11 to move upwardly in an arcuate line of movement until a position such as the position indicated by the dotted lines 50 is attained. At this point, the force of gravity exerted upon the scooped up material causes it to fall into the body of the truck; the momentum of the scooped up material, controlled by the forward speed of the truck, carries said material to a point more or less forward of the arms. These operations are continued in the manner indicated until the work is done. When it is time to drive the truck away, the arms and scoop are brought up into the position indicated by the dotted lines 50. As has already been mentioned, lever catch 53 engages and holds said arms in said position while, at the same time, stud posts 49 disengage the pawls from the ratchet wheels. The truck may now be operated in the usual manner without any interference on the part of the scoop device herein described.

Bearing in mind that frequently the truck in question may be required to traverse uneven roads or ground and that relative movement between the truck body and the drive wheels may thereby be effected, the following features are incorporated into the mechanism: a tension spring 55 affixed at its upper end to a bracket 56 mounted on the truck body and at its lower end to the handle end of the catch member 53, tends to urge said catch member into uninterrupted engagement with stud pin 52 irrespective of the relative position of the truck body with respect to the truck wheels. To insure such uninterrupted engagement, a further precaution is taken. A sliding bolt member 57 slidably affixed to the catch end of catch member 53 by means of brackets 58 locks said catch member into positive engagement with said pin 52. A pin 59 on bolt 57 engaged by spring members 59a on brackets 58 positions said bolt in locking or unlocking position. This locking mechanism is shown very clearly in Fig. 8. It has its counterpart in Fig. 7. There a locking mechanism 70 constructed in the same manner and of the same parts as the locking mechanism above described, is affixed to the latch members 17. It will be seen that when the bolts of said locking members 70 are placed in locking position with respect to guides or finders 19, they engage said guides and thereby effectively prevent upward or opening movement of the latch members.

In Fig. 6, a slightly modified embodiment of the invention is shown. In this embodiment, a ratchet wheel 60 is splined to the stud shaft or hub extension 61. This ratchet wheel is engaged by the pawl above described in the manner above described. In all other respects this embodiment is similar to the embodiment shown in Figs. 1 to 5, inclusive.

The invention herein described and claimed is considered to be a basic invention and many modifications may be incorporated therein without departing from the basic principles thereof. For example, although the device has been described above in connection with a motor truck having a rear wheel drive, it is clear that the device may be attached to any other kind of vehicle having a pair of drive wheels and a body into which to dump the material sought to be removed. It is immaterial whether these drive wheels are rear wheels or front wheels or wheels intermediate the front and rear. It is clear too, that the device may be made to operate at the front of the vehicle instead of at the rear. In such case, the scoop operation would take place when the vehicle moves in a forward direction and the lifting operation when it moves toward the rear. As has already been indicated, the mechanism herein described may be adapted to a pair of drive shafts or to a single elongated drive shaft mounted on a horizontally reciprocating mechanism. The dumping body need not be attached directly or indirectly to the drive shafts but may instead be a wholly separate and independent unit mounted, for example, on a conveyor belt or on railroad car trucks. The arms 10 are shown to be tubular members. Obviously, this need not necessarily be the case. I-shaped members or members of other suitable shape would certainly suffice. Under certain circumstances, a single arm instead of the two arms herein described, would be sufficient. A skilled mechanic presented with a specific problem could readily determine whether to use one arm or two arms or, for that matter, a greater number than two arms. Other kinds of ratchet mechanisms, latch members, catch members and release mechanisms may be used without departing from the basic principles of the invention as described and claimed. Aside from ratchet mechanisms other types of mechanism may be used to effect upward movement of the arms 10. Thus, for example, one way friction grabbers similar in construction to the brake band and drum constructions of older automobiles may be used in place of the ratchet mechanisms hereinabove described.

I claim:

1. The combination with a vehicle having a body and a pair of drive wheels, of a pair of ratchet wheels connected to said drive wheels coaxially therewith, a pair of lifting arms pivotally mounted at one end coaxially with said drive and ratchet wheels, a scoop mounted at the opposite end of said arms and a pair of pawls mounted on said arms adjacent said pivoted end and engaging said ratchet wheels whereby the arms are caused to pivot upwardly raising the scoop in an arcuate line of movement from a ground position to a position above the vehicle body when the drive wheels rotate in one direction, and the arms are permitted to pivot downwardly and the scoop to return to the ground position along said arcuate line of movement in response to the attraction of gravity when the drive wheels rotate in the opposite direction, further rotation of the drive wheels in the latter direction causing no vertical change in the ground position of the scoop.

2. The combination with a vehicle having a body and a pair of drive wheels, of a pair of hub extensions on said drive wheels, a pair of ratchet wheels fixedly mounted on said hub extensions, a pair of lifting arms pivotally mounted at one end on said hub extensions, a scoop mounted at the opposite end of said arms and a pair of pawls mounted on said arms adjacent said pivoted end and engaging said ratchet wheels whereby the arms are caused to pivot upwardly raising the scoop in an arcuate line of movement from a ground position to a position above the vehicle body when the drive wheels rotate in one direction, and the arms are permitted to pivot downwardly and the scoop to return to the ground position along said arcuate line of movement in response to the attraction of gravity when the drive wheels rotate in the opposite direction, further rotation of the drive wheels in the latter direction causing no vertical change in the ground position of the scoop.

3. The combination with a vehicle having a body and a pair of drive wheels, of a pair of hub extensions on said drive wheels, a pair of ratchet wheels rotatably mounted on said hub extensions, a pair of speed reducing gear trains connecting said hub extensions to said ratchet wheels, a pair of lifting arms pivotally mounted at one end on said hub extensions, a scoop mounted at the opposite end of said arms and a pair of pawls mounted on said arms adjacent said pivoted end and engaging said ratchet wheels whereby the arms are caused to pivot upwardly raising the scoop in an arcuate line of movement from a ground position to a position above the vehicle body when the drive wheels rotate in one direction, and the arms are permitted to pivot downwardly and the scoop to return to the ground position along said arcuate line of movement in response to the attraction of gravity when the drive wheels rotate in the opposite direction, further rotation of the drive wheels in the latter direction causing no vertical change in the ground position of the scoop.

4. The combination with a vehicle having a body and a pair of drive wheels, of a pair of hub extensions on said drive wheels, a pair of gear wheels fixedly mounted on said hub extensions, a pair of drums having external ratchet teeth and internal gear teeth rotatably mounted on said hub extensions, a pair of speed reducing gear trains connecting said gear wheels to said drum gear teeth, a pair of lifting arms pivotally mounted at one end on said hub extensions, a scoop mounted at the opposite end of said arms and a pair of pawls mounted on said arms adjacent said pivoted end and engaging said ratchet wheels whereby the arms are caused to pivot upwardly raising the scoop in an arcuate line of movement in response to the attraction of gravity when the drive wheels rotate in the opposite direction.

5. The combination with a vehicle having a body and a pair of drive wheels, of a pair of ratchet wheels connected to said drive wheels coaxially therewith, a pair of lifting arms pivotally mounted at one end coaxially with said drive and ratchet wheels, a scoop mounted at the opposite end of said arms and a pair of pawls mounted on said arms adjacent said pivoted end and engaging said ratchet wheels whereby the arms are caused to pivot upwardly raising the scoop in an arcuate line of movement from a ground position to a position above the vehicle body when the drive wheels rotate in one direction, and the arms are permitted to pivot downwardly and the scoop to return to the ground position along said arcuate line of movement in response to the attraction of gravity when the drive wheels rotate in the opposite direction, a pair of release mechanisms on said vehicle body which engage said pawls when the lifting arms pivot upwardly to a predetermined position, causing said pawls to pivot out of engagement with said ratchet wheels, a catch and locking mechanism which engages and holds said lifting arms when said predetermined position is reached, and a latch and locking mechanism which latches and locks said arms in said pivotally mounted position.

ALBERT A. LA POINTE.